Patented Mar. 1, 1938

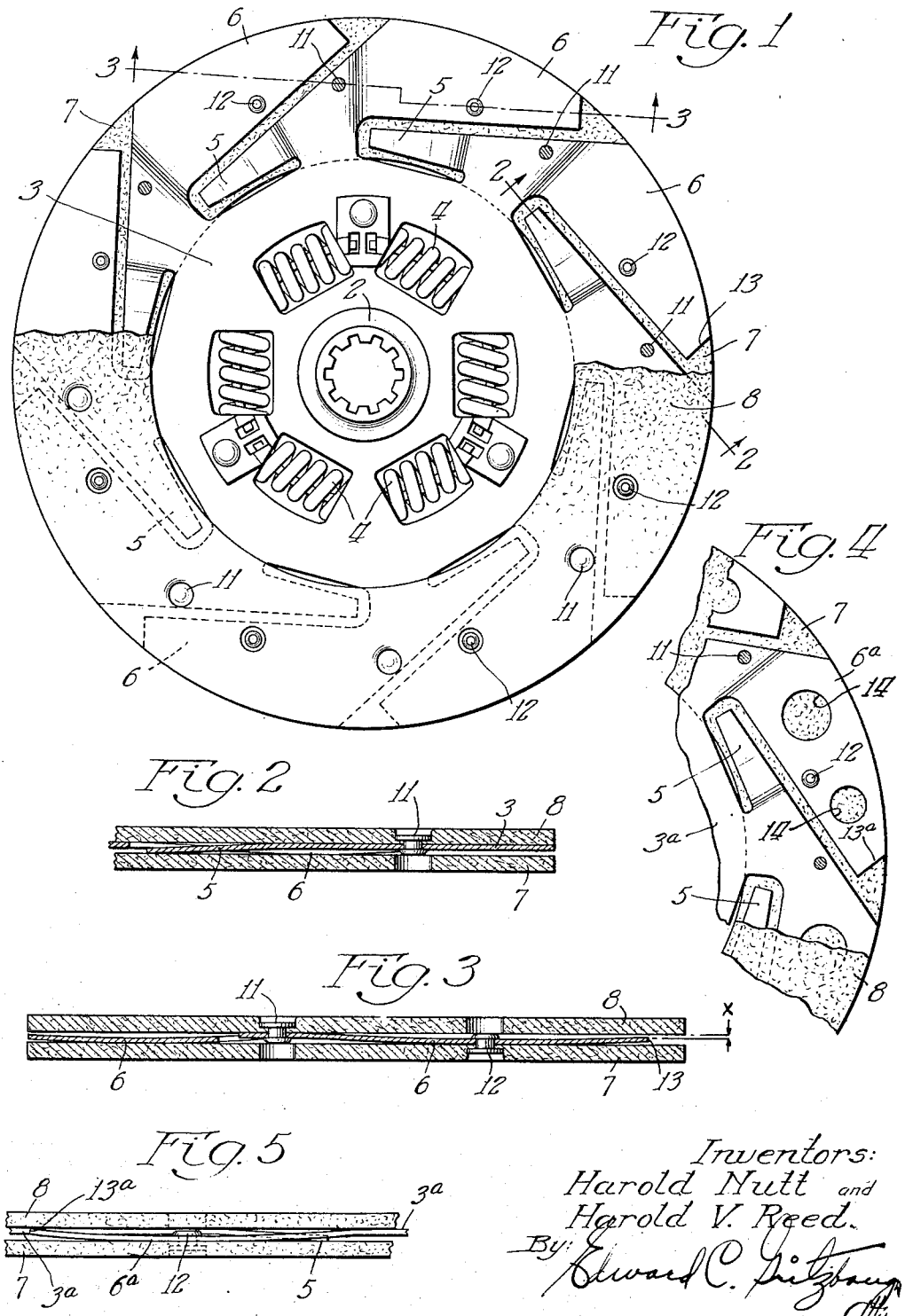

2,110,051

UNITED STATES PATENT OFFICE 2,110,051

CLUTCH PLATE

Harold Nutt and Harold V. Reed, Chicago, Ill., assignors to Borg-Warner Corporation, Chicago, Ill., a corporation of Illinois Application March 2, 1936, Serial No. 66,555

8 Claims. (Cl. 192—107)

This invention relates to improvements in clutch plates, and more particularly to clutch plates for friction clutches of the type intended for use in motor vehicles wherein means are provided for establishing a multiple stage cushion support for the friction facings of the plate.

An object of the invention is to provide a cushion clutch plate having multiple stage action wherein the points of facing support on the first stage cushions are staggered with respect to the points of facing support on the second stage cushions, thereby to provide uniform distribution of the facing supports during compression of the cushions of both stages.

Another object is to provide in a friction clutch plate yielding cushions for facing support, one set acting in the manner of a simple cantilever, and the second set having initial action as a cantilever and subsequent action as a half-elliptic, thereby to permit of the use of relatively short wings forming the cushions, and of a relatively large number of such wings within the space in the allotted peripheral portion of the plate.

Another object is to provide a friction clutch plate of the character described which is extremely simple in construction and which may be manufactured at relatively low cost.

Other objects, the advantages and uses of the invention will be apparent after reading the following specification and claims, and after examination of the drawing forming a part of the specification, wherein:

Fig. 1 is an elevation of a friction clutch plate constructed in accordance with our invention, a part thereof being broken away;

Fig. 2 is a sectional view along the line 2—2 of Fig. 1;

Fig. 3 is a sectional view along the line 3—3 of Fig. 1;

Fig. 4 is a fragmentary elevation illustrating another form of the clutch plate; and Fig. 5 is a side elevation of the clutch plate illustrated in Fig. 4.

We have selected for illustration herein a friction clutch plate of the type intended for use in the engine clutch of a motor vehicle. The clutch plate comprises in general a hub member 2 splined for mounting upon a transmission drive shaft, a circular steel plate 3 mounted concentrically of the hub 2 and drivingly connected therewith through a series of torsional dampener springs 4. The springs 4 and mounting therefor may be constructed after the manner disclosed in U. S. Patent No. 2,028,951, dated January 28, 1936.

A plurality of wings 5 and 6, formed in the peripheral portion of the plate 3 in a manner hereinafter described, provide cushion supports for an annular friction facing 7 yieldably to space the facing away from the plane of the plate. A second annular friction facing 8 is secured to the opposite side of the plate. In the clutch plate shown the plate is intended to be mounted with the facing 8 toward the flywheel of the engine.

With reference to Fig. 1, it will be noted that the wings 5 and 6 are relatively short in length so as to provide for a maximum number of such wings throughout the circumference of the peripheral portion of the plate 3, and that the wings are formed by slotting the outer portion of the plate in the manner shown to cause each pair of wings 5 and 6 to lie with the wing 6 radially outward of the wing 5. Each of the wings is tapered in the direction of their outer ends so as to provide ample strength at their points of merger with the plate body and to lend greatest resiliency to their outer portions. The wings 5 extend circumferentially in a direction opposite to the wings 6.

The wings 5 (see Fig. 2) are bent outwardly from the plane of the plate to provide simple cantilevers for the support of the facings 7, and contact the facings 7 at their outermost end portions when the plate is in a state of non-compression. Rivets 11, extending through the plate 3 and the facing 8, serve to fix the facing 8 against movement relative to the plate. The facing 7 is unattached to the wings 5.

The wings 6 extend away from the plane of the plate 3 (see Fig. 3) with their mid-portions contacting the facing 7 and riveted thereto by rivets 12. The outer portions of the wings 6 curve inwardly toward the plane of the plate with their ends spaced slightly away from the adjacent wall of the facing 8 as indicated at $x$. This construction of the wings 6 provides a cushion in the form of a cantilever upon which the facing 7 is supported and secured, which cantilever becomes a half-elliptic spring cushion upon engagement of the outermost end 13 of the wing with the adjacent wall surface of the facing 8. During the functioning of the wing cushions 6 as cantilevers, the resistance to facing movement in the direction of the plate 3 is relatively less than the resistance to facing movement afforded during their function as half-elliptic spring cushions.

The clutch plate, as illustrated in Figs. 1, 2 and 3, shows the parts as they appear when the plate is uncompressed, with both sets of cushions provided by the wings 5 and 6 acting as simple cantilever spring cushions. It is with the parts in these positions that the clutch is in full "release" position. As the driving parts of the clutch (not shown) are brought to bear against the friction facings 7 and 8, the facing 7 will be urged toward the plate 3 to cause initial engagement of the clutch under the relatively light yielding cushion action necessary during the so-called "slip" period of clutch engagement. This action provides smooth clutch engagement. As the driving parts of the clutch are further engaged with the clutch plate, the outer ends 13 of the wings 6 will contact with the facing 8 and the wings 6 thereafter will function to provide increased resistance to the movement of the facing 7 toward the clutch plate 3, thus to establish a second stage of cushion operation under increased cushion resistance as required to transmit smoothly the higher torque encountered in full vehicle load.

It will be apparent that we have provided in the clutch plate described herein a multiple-stage cushion arrangement which by virtue of the construction and disposition of the cushions permits of the use of relatively short wings comprising the cushions, and that, therefore, a relatively large number of such wings may be distributed about the circumferential portion of the plate to present a large number of points of support for the yieldingly supported facing 7. This feature is one of great importance in bringing about smooth clutch operation, and in reducing wear upon the facing. We have furthermore formed the cushion wings in such a manner that the points of contact between the wings 5 forming one set of cushions and the wings 6 forming the other set of cushions with the facing 7 are staggered, thus to carry forward to a greater extent equal and uniform distribution of facing support throughout the entire clutch engaging function.

Another and important feature embodied in the clutch plate herein described is the disposition of the cushions of each set, one cushion of one set radially beyond the cushion of the other set, and all extending in directions circumferentially of the plate. This arrangement provides for maintaining the contacting surfaces of each set of cushions with the facing 7 in relatively close proximity to one another as distinguished from cushions heretofore proposed in which the first and second stage cushions contact with the facing alternately about the plate.

In Figures 4 and 5 we have illustrated another form of our improved clutch plate in which parts similar in character to those illustrated in Figure 1 bear like reference numerals, and in which parts of modified construction bear the suffix "a". In this form of the clutch plate we have formed the wings 6ª as half-elliptic spring cushions, each wing being fixed by rivets 12 to the facing 7. The bowed portions of the wings 6ª extend outwardly away from the plane of the disc substantially the same distance as to the outer ends of the wings 5 forming the inner array of cushions. We have also formed openings 14 through the wings 6ª to decrease the cross section of the wings in their intermediate or bowed portions with the result that the resistance offered by the cushions 6ª is appreciably decreased, thus to more nearly match the resistance offered by the wing cushions 5.

While we have illustrated and described herein two specific embodiments of our improved clutch plate, it will be apparent that the invention may be otherwise embodied within the spirit and scope of the appended claims.

We claim:

1. In a friction clutch plate, a hub, a circular steel plate mounted upon the hub and concentric therewith, means associated with the plate providing a plurality of yieldable facing supporting wings extending away from the plane of the body of the plate, certain of said wings extending circumferentially in one direction and certain other of said wings extending circumferentially in the opposite direction, and a friction facing supported upon said wings, all of said wings extending in one circumferential direction being formed to provide yieldable cantilever spring supports for said facing during initial compression of the disk, and thereafter to provide half-elliptic yieldable spring supports during continued compression of the clutch plate.

2. A friction clutch plate as defined in claim 1, wherein the wings extending circumferentially in the other said direction are formed to provide yielding cantilever supports for the facing during initial and continued compression of the clutch plate.

3. A friction clutch plate as defined in claim 1, wherein certain of the wings extending circumferentially in one direction are formed with openings punched therethrough to increase the flexibility thereof.

4. A friction facing, as defined in claim 1, wherein the points of facing support provided by said wings extending circumferentially in one direction are staggered with respect to the points of facing support provided by the said wings extending circumferentially in the opposite direction.

5. A friction clutch plate comprising, a hub, a circular metal plate mounted concentrically of the hub, said metal plate having a plurality of sets of yieldable wings in the peripheral portion thereof extending away from the plane of the body of the plate, each of said wings having one end free, the wings of each set being in circumferential array and the wings of one set being disposed radially beyond the wings of the other set, said wings being formed so that those of one set possess a different resistance to flexing than those of another set, and a friction facing supported upon said sets of wings, one of said sets of wings being operable as yieldable cantilever supports for the facing, and the wings of another set operable as yieldable half-elliptic supports for the facing.

6. A friction clutch plate comprising, a hub, a circular metal plate mounted concentrically of the hub, said metal plate having a plurality of sets of yieldable wings in the peripheral portion thereof extending away from the plane of the body of the plate, each of said wings having one end free, the wings of each set being in circumferential array and the wings of one set being disposed radially beyond the wings of the other set, said wings being formed so that those of one set possess a different resistance to flexing than those of another set, and a friction facing supported upon said sets of wings, all of said wings being of lesser width at their free ends than at opposite ends, thus to increase flexibility of the free end portions thereof.

7. A friction clutch plate comprising, a hub, a circular metal plate mounted concentrically of the hub, said metal plate having a plurality of sets of yieldable wings in the peripheral portion thereof extending away from the plane of the body of the plate, each of said wings having one end free, the wings of each set being in circumferential array and the wings of one set being disposed radially beyond the wings of the other set, said wings being formed so that those of one set possess a different resistance to flexing than those of another set, a friction facing supported upon said sets of wings, said facing being fixed to one only of said sets of wings, and a second facing disposed on the opposite side of the metal plate and secured to the plate against movement relative thereto.

8. A friction clutch plate comprising, a hub, a circular metal plate mounted concentrically of the hub, said metal plate having a plurality of sets of yieldable wings in the peripheral portion thereof extending away from the plane of the body of the plate, each of said wings having one end free, the wings of each set being in circumferential array and the wings of one set being disposed radially beyond the wings of the other set, said wings being formed so that those of one set possess a different resistance to flexing than those of another set, and a friction facing supported upon said sets of wings, the points of facing support provided by one said set of wings being staggered with respect to the points of facing support provided by the other said set of wings.

HAROLD NUTT.
HAROLD V. REED.